United States Patent [19]
Duncan

[11] Patent Number: 6,147,953
[45] Date of Patent: Nov. 14, 2000

[54] OPTICAL SIGNAL TRANSMISSION APPARATUS

[75] Inventor: David Duncan, Auburn, Calif.

[73] Assignee: Duncan Technologies, Inc., Auburn, Calif.

[21] Appl. No.: 09/048,169

[22] Filed: Mar. 25, 1998

[51] Int. Cl.[7] .................................................. G11B 7/00
[52] U.S. Cl. ...................... 369/112; 369/44.12; 369/110
[58] Field of Search .................... 369/112, 110, 369/109, 103, 44.23, 44.24, 44.12, 44.37

[56] References Cited

U.S. PATENT DOCUMENTS

| | | |
|---|---|---|
| 4,917,014 | 4/1990 | Loughry et al. . |
| 5,010,822 | 4/1991 | Folsom . |
| 5,095,472 | 3/1992 | Uchino et al. ........................ 369/44.37 |
| 5,124,841 | 6/1992 | Oishi . |
| 5,278,812 | 1/1994 | Adar et al. .............................. 369/110 |
| 5,323,378 | 6/1994 | Kim et al. . |
| 5,331,622 | 7/1994 | Ernst et al. .............................. 369/110 |
| 5,406,543 | 4/1995 | Kobayashi et al. . |
| 5,467,336 | 11/1995 | Ando et al. . |
| 5,511,060 | 4/1996 | Jan-Jiu et al. ........................... 369/118 |
| 5,621,714 | 4/1997 | Kobayashi et al. . |
| 5,644,563 | 7/1997 | Yang . |
| 5,646,778 | 7/1997 | Shuman ................................... 369/110 |
| 5,646,928 | 7/1997 | Wu et al. . |
| 5,650,874 | 7/1997 | Shuman . |
| 5,696,747 | 12/1997 | Bartholomeusz ....................... 369/110 |
| 5,701,287 | 12/1997 | Hineno et al. . |
| 5,708,644 | 1/1998 | Hasegawa . |

OTHER PUBLICATIONS

The Laser Guide Book, Hecht, J. p. 331, McGraw–Hill, 1992.

Primary Examiner—Nabil Hindi
Attorney, Agent, or Firm—Thomas R. Lampe

[57] ABSTRACT

Optical transmission apparatus including light transmitting first and second optical coupler elements bonded together along a planar junction. A coating at the planar junction reflects and redirects a portion of an optical signal entering the apparatus to a surface of the optical transmission apparatus.

17 Claims, 8 Drawing Sheets

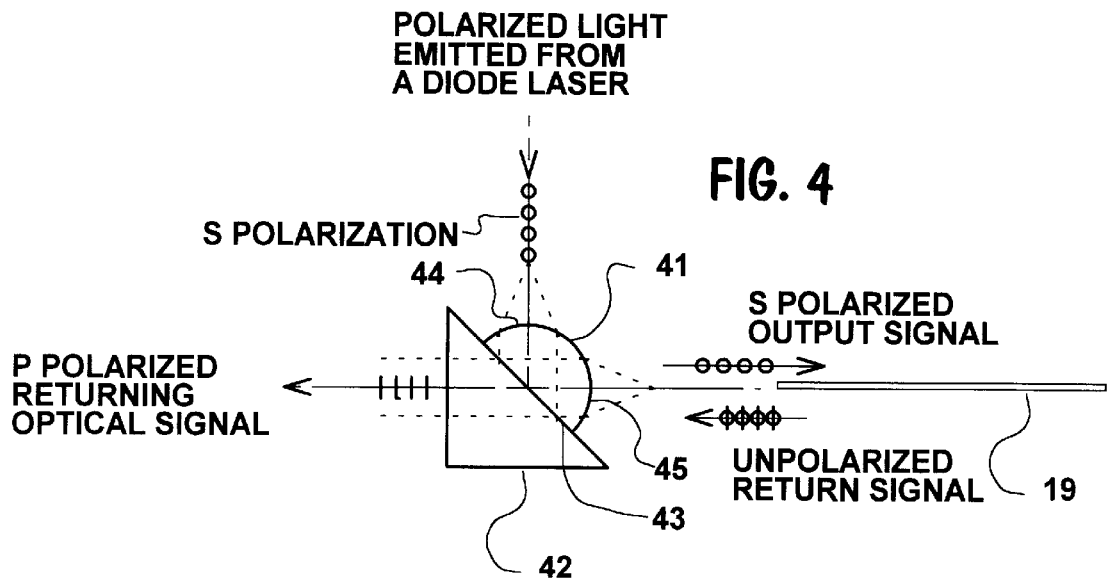
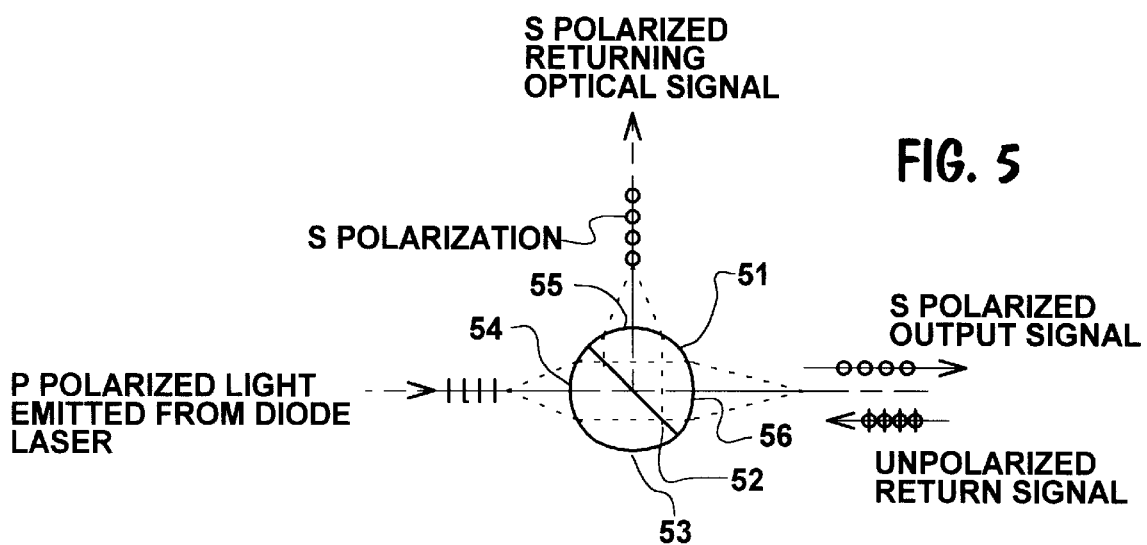

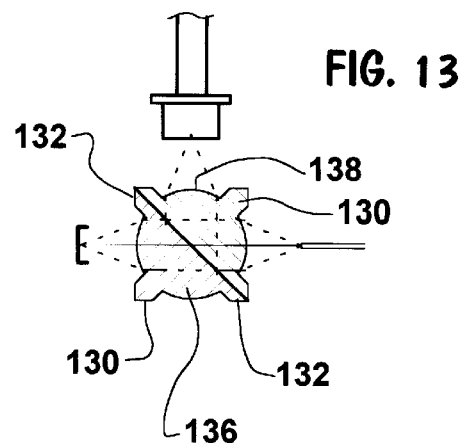
FIG. 13
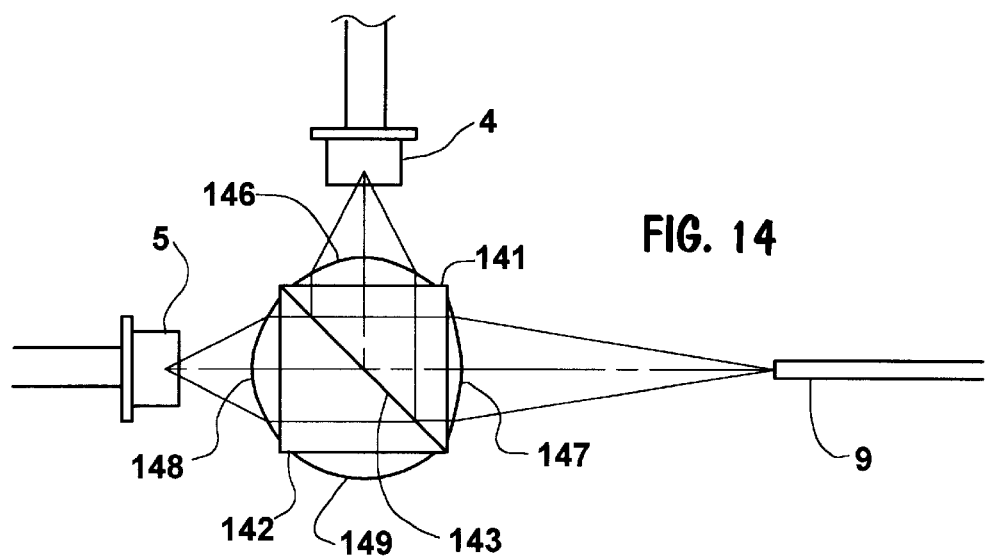
FIG. 14
TOP VIEW
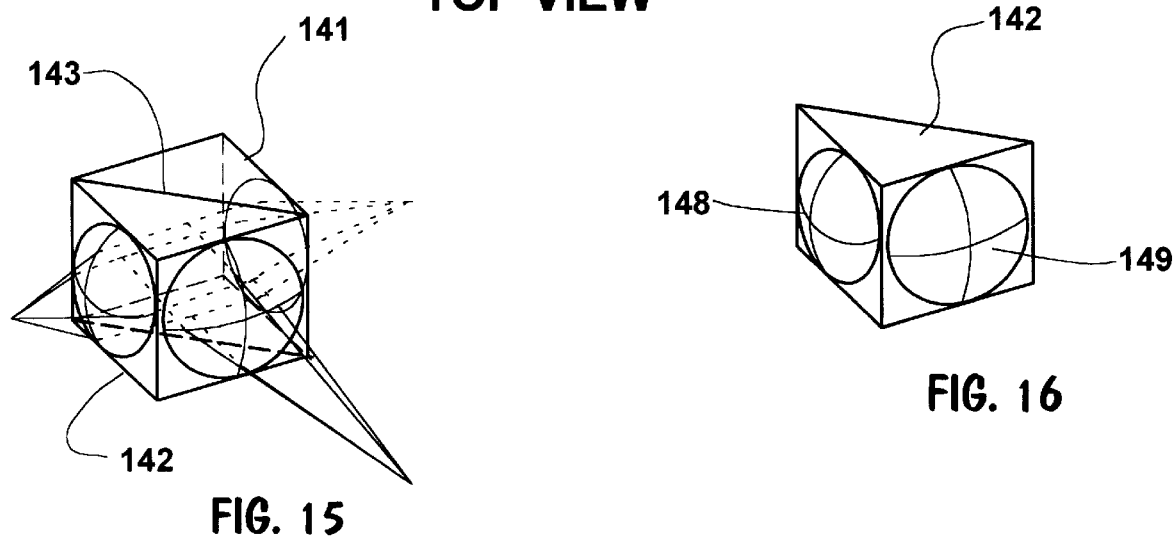
FIG. 15
FIG. 16

OPTICAL SIGNAL TRANSMISSION APPARATUS

TECHNICAL FIELD

This invention relates to optical signal transmission apparatus and more particularly to an integrated optical coupler employed in association with one or more laser diodes or light emitting diodes (LEDs). The coupler allows separation and detection of a return optical signal or may be employed for other purposes such as efficient combining of output from a plurality of diode lasers.

BACKGROUND OF THE INVENTION

Many applications of diode lasers and LEDs involve the columnation of or focusing of the emitted optical signal and measurement of a return signal along the optical axis of the outgoing signal. Examples of such systems include magneto-optical, CD-ROM, and DVD computer mass storage devices wherein a diode laser is focused onto a spot on the recording media and a reflected signal is measured.

Prior art optics for such systems conventionally include a plurality of separate optical elements through which the laser light must pass. It is not untypical for the laser light to pass through eight or more separate optical surfaces prior to arriving at the storage media and six or more additional surfaces before arriving at a photodetector. Significant optical losses and degradation of signal quality occur due to optical signal passage through these surfaces. Alignment of the laser and the optical elements employed is critical and misalignment can and does occur on an all too frequent basis.

In duplex fiber optic communication systems employing diode lasers or LEDs the optical couplers employed cause significant loss of optical signal, often resulting in a small percentage of the emitter energy arriving at the photodetector employed in such systems. This is true regardless of the type of emitter-to-fiber couplers employed in prior arrangements, including for example, cylindrical lenses, butt contact, spherical ball couplers, and aspheric lenses.

The following United States patents and publication disclose systems believed representative of the current state of the prior art: U.S. Pat. No. 5,644,563, issued Jul. 1, 1997, U.S. Pat. No. 5,701,287, issued Dec. 23, 1997, U.S. Pat. No. 5,406,543, issued Apr. 11, 1995, U.S. Pat. No. 5,621,714, issued Apr. 15, 1997, U.S. Pat. No. 5,467,336, issued Nov. 14, 1995, U.S. Pat. No. 5,010,822, issued Apr. 30, 1991, U.S. Pat. No. 5,650,874, issued Jul. 22, 1997, U.S. Pat. No. 5,124,841, issued Jun. 23, 1992, U.S. Pat. No. 5,646,928, issued Jul. 8, 1997, U.S. Pat. No. 4,917,014, issued April, 1990, U.S. Pat. No. 5,323,378, issued June, 1994, U.S. Pat. No. 5,708,644, issued January, 1998, and The Laser Guide Book, Hecht, J., Page 331, McGraw-Hill, 1992.

DISCLOSURE OF INVENTION

The present invention relates to optical signal transmission apparatus which utilizes an optical coupler of specialized character which is simple and relatively inexpensive and is highly reliable and efficient in operation in a variety of optical signal transmission environments.

The invention includes a first optical coupler element formed of light transmitting material for receiving an optical signal and transmitting the optical signal in a linear direction and having at least one convex surface and a planar surface, the planar surface being disposed at an angle to the linear direction.

A second optical coupler element formed of light transmitting material having a planar surface is bonded along a planar junction to the planar surface of the first optical coupler element.

At least one coating is disposed at the planar junction for reflecting and redirecting at least a portion of an optical signal transmitted by the first optical coupler element to a surface of the optical signal transmission apparatus. The planar junction disclosed herein is disposed at a generally forty-five degree angle relative to the linear direction of optical signal transmission.

In embodiments of the apparatus disclosed herein the optical coupler is employed in conjunction with one or more photodetectors to sense the redirected optical signal.

Another embodiment of the invention utilizes the optical coupler to combine the optical signal from two diode lasers into a single optical signal and either couple the signal into an optical fiber by focusing the light to a spot or emit the combined signal as a collimated beam using a single optical element.

In yet another embodiment the unitary optical coupler performs the functions of collimating a diode laser, rotation of the diode laser beam polarization, focusing of the outgoing beam, and collimation and separation of a returning beam to be perpendicular to the diode laser axis.

In another arrangement the invention is utilized to provide spectral separation of the return light, allowing multichannel radiometer detection using photodetectors or spectrometer detection using a series of photodetectors.

Other features, advantages, and objects of the present invention will become apparent with reference to the following description and accompanying drawings.

BRIEF DESCRIPTION OF DRAWINGS

FIG. 4 is a schematic view of one form of optical coupler constructed in accordance with the teachings of the present invention receiving polarized light from a diode laser, reflecting the laser beam from an internal coated surface and transmitting the returning optical signal to an optical sensor;

FIG. 5 illustrates an alternative embodiment of the optical coupler wherein a diode laser beam is transmitted through the internal coated surface thereof and the returning optical signal is reflected to an optical sensor;

FIG. 13 illustrates an embodiment of the optical coupler integrally molded with mounts;

FIG. 14 is a plan view of a signal transmission system employing an optical coupler having aspheric surfaces molded to a pair of right angle prisms;

FIG. 15 is a perspective view of the optical coupler of FIG. 14;

FIG. 16 is a perspective view illustrating one of the optical coupler elements of FIG. 14 prior to bonding with the other optical coupler element.

MODES FOR CARRYING OUT THE INVENTION

Figure 1:
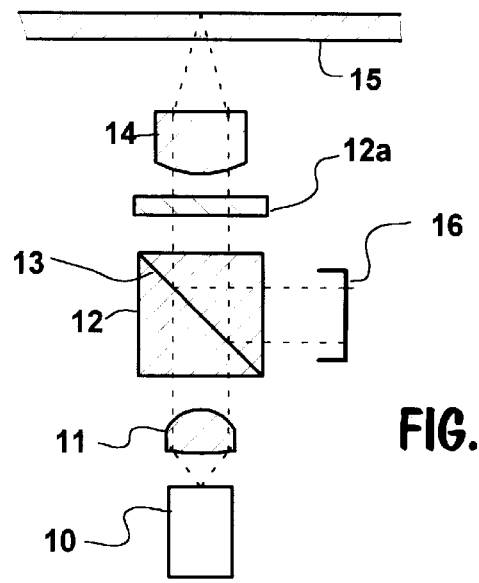
FIG. 1 is a schematic view illustrating conventional prior art pick-up optics used in an optical storage system for computers.

Prior art optics for a computer optical driver are shown in FIG. 1. In FIG. 1 light is emitted from a diode laser 10, focused by lens 11, transmitted through a beam splitter 12, circularly polarized by quarter wave plate 12a, focused into a spot by lens 14, reflected off from the active media surface 15, recollimated by lens 14, linearly polarized by quarter wave plate 12a, reflected by surface 13 in the beam splitter 12, and sensed by the photodetector 16.

Three primary optical elements 11, 12, 14 are required in this design. Laser light passes through eight optical surfaces in these elements 11, 12, 14 prior to arriving at the storage media 15 and six surfaces in elements 13, 14 before arriving at the photodetector 16. Significant optical losses and degradation of signal quality occur since the signal passes through a total of ten surfaces starting from the diode laser 10 before arriving at the photodetector 16. Alignment of the laser 10 and four optical elements 11, 12, 12a 14 is critical to maintain a small read spot size on storage media 15.

Figure 2:
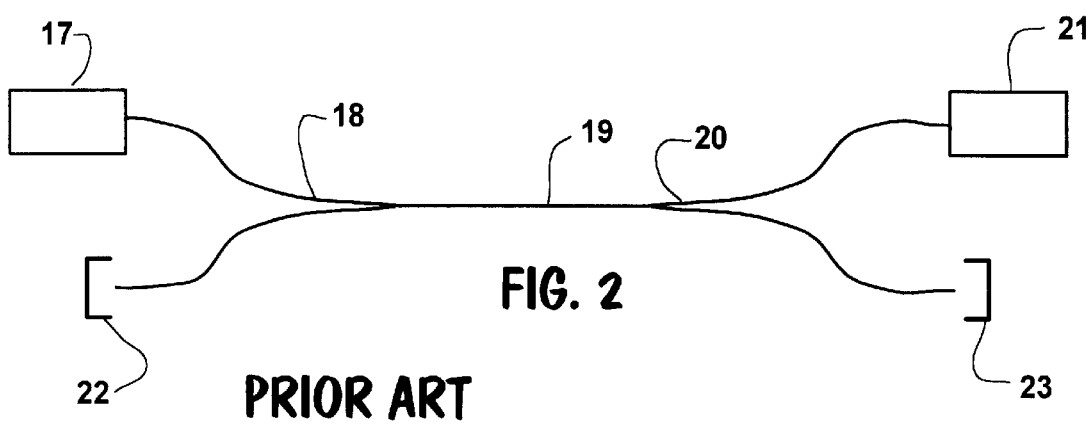
FIG. 2 is a schematic view showing a typical known duplex fiber optic communication system.

In duplex fiberoptic communication systems, prior art consists of an architecture such as that shown in FIG. 2. In FIG. 2, a diode laser or LED 17 provides an optical signal into one leg of a fiberoptic 2×1 spliced coupler 18. This optical signal is transmitted through an optical fiber to a second 2×1 spliced coupler 20 where roughly one half the optical signal is transmitted to a photodetector 23. Communication in the opposite direction occurs by the optical emitter 21 inserting an optical signal into 2×1 spliced coupler 20, passing through optical fiber 19, split at spliced coupler 18, and then sensed at photodetector 22. Each 2×1 spliced coupler causes roughly a 50% loss of optical signal, resulting in less than 25% of the emitter energy arriving at the photodetector. Various emitter-to-fiber couplers are used to couple emitter energy into the 2×1 spliced coupler including cylindrical lenses, butt contact, spherical ball couplers, and aspheric lenses (not shown).

Figure 3:
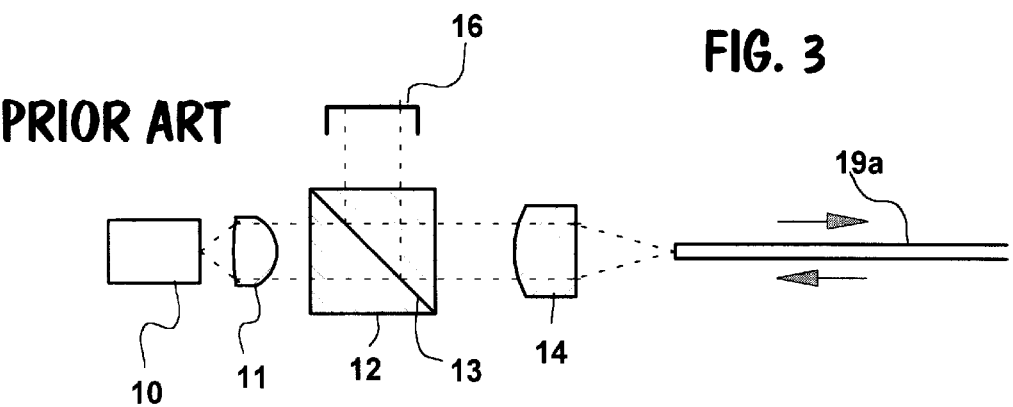
FIG. 3 is a schematic view illustrating a prior art fiber optic sensor.

In many fiberoptic sensor applications, light is inserted into an optical fiber, transmitted to a transducer, and either a reflected or stimulated signal is returned through the fiberoptic signal and is sensed. The stimulated signal can result from fluorescence or other emission. In FIG. 3 the optical configuration from FIG. 2 provides the emission and sensing optics for a sensor application. The optical storage media 15 is replaced by an optical fiber 19. Light is transmitted through the optical fiber to an optical sensor (not shown). Light emitted or reflected from the optical sensor returns through the optical fiber 19 and is sensed by photodetector 16.

FIG. 4 shows the construction of a first embodiment of the present invention having optical coupler element 41 cemented to optical coupler element 42 forming a single optical coupler with a coating 43 at the interface between elements 41 and 42. In this embodiment the diode laser light is collimated by either a spherical or aspheric convex surface 44 in element 41. The laser light is reflected from a multi-layer dielectric polarized surface 43 inclined at generally 45 degrees relative to the laser light. This dielectric coating may be applied to either of the elements 41 or 42.

The laser is oriented such that the polarized laser light is reflected by the polarized surface 43. The reflected polarized laser light is focused by a convex surface 45 into a small spot. Surface 45 can be spherical or aspheric and may be a different contour than surface 44. The output optical signal may be inserted into an optical fiber 19 for sensor or duplex fiberoptic communications applications. Return unpolarized light is collimated by the convex surface 45 in element 42. The P polarization component of the returning signal is transmitted by coating 43. Element 42 may have a plane, spherical, or aspheric surface where the returning signal exits.

With the first optical coupler embodiment of FIG. 4 using a multi-layer dielectric polarized coating, roughly 50% of the returning unpolarized light will be available to a sensor. In applications where the returning signal is of a different wavelength than the laser wavelength, a dichroic coating may be used instead of the polarized coating. The dichroic coating is specified to reflect the diode laser light and transmit the return light. The return light may be of a different wavelength than outgoing light in sensor applications, i.e., a fluorescence signal is measured that is of a longer wavelength than the excitation wavelength (the diode laser). In duplex fiberoptic communications systems the diode laser on each end of the fiberoptic may be of a different wavelength allowing dichroic separation. This would allow nearly 100% of the optical signals to be sensed rather than 25% using prior art spliced couplers. A dichroic coating may be used in the second embodiment to replace the polarized coating for the same benefits just described.

FIG. 5 shows the construction of a second embodiment having optical coupler element 51 cemented to optical coupler element 53 with a multi-layer dielectric polarized coating 52 at the interface between elements 51 and 53. In this embodiment the diode laser light is collimated by either a spherical or aspheric convex surface 54 in element 53. The laser is oriented such that the laser light is transmitted through the coating 52. The collimated laser light is focused by convex aspheric or spherical surface 56 forming a small spot. The output optical signal may be inserted into an optical fiber for sensor or duplex fiberoptic communications applications. Returning unpolarized light is collimated by surface 56 in element 51. The S polarization component of the collimated returning light is reflected by surface 52. Element 51 may have a plane, spherical, or aspheric surface where the return light exits.

The diode laser light is polarized and remains polarized after exiting the optical coupler. For fiberoptic applications, the light will become unpolarized after transmission through the fiber. Return light will also be unpolarized. For direct reflection applications, i.e., magneto-optical and optical disk storage applications, the reflected light will be polarized. An additional element is inserted into the invention to rotate the polarization 90 degrees resulting in reflection at the internal polarized surface. This embodiment is shown in FIG. 6.

Figure 6:
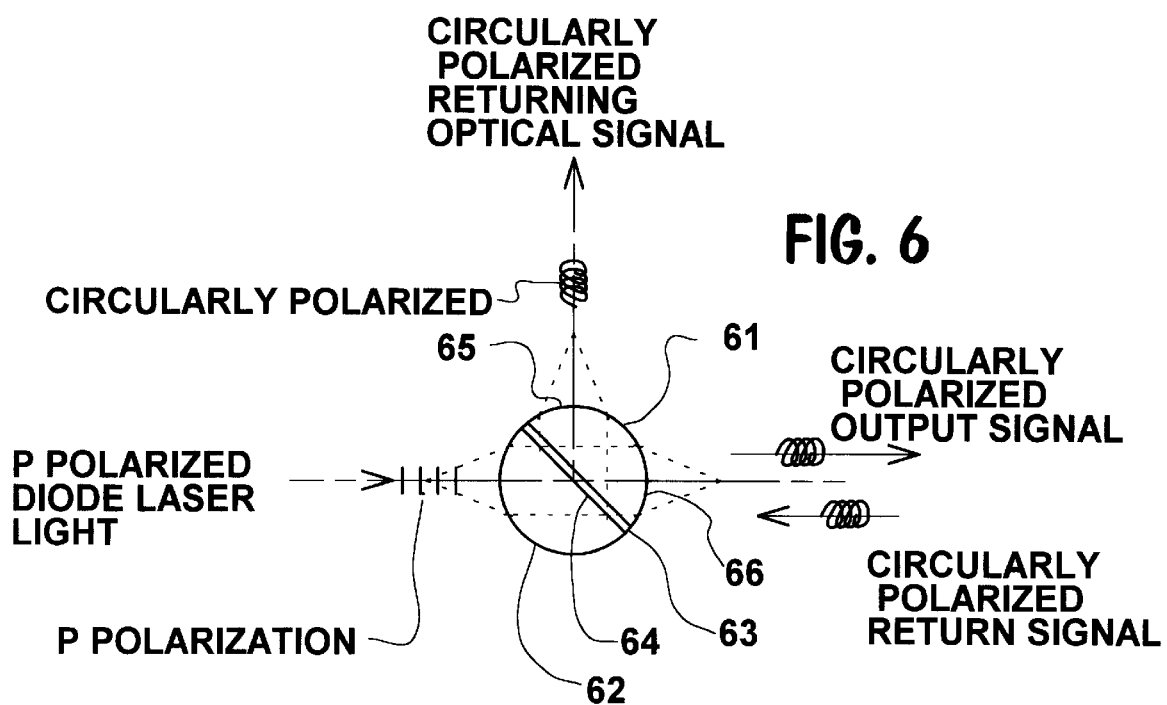
FIG. 6 illustrates yet another embodiment of the optical coupler wherein a diode laser beam is transmitted through the internal coated surface thereof, circularly polarized using a quarter wave retardation plate, and focused into a spot upon exiting the optical coupler.

In the embodiment of FIG. 6, optical coupler element 61 is bonded to a quarter wave plate 63 which is also bonded to optical coupler element 62. Element 62 has a multi-layer dielectric polarizing coating 64 at the planar junction of the elements, i.e., the bond interface at the quarter wave plate 63. P polarized diode laser light is collimated by spherical or aspheric surface 67 in element 62. This light is transmitted through coating 64. A quarter wave retardation plate 63 circularly polarizes the laser light. Aspheric or spherical surface 66 in element 61 focuses the laser light into a small spot. This laser radiation is reflected from a surface and is recollimized by surface 66 in element 61. The quarter wave plate 63 converts the circularly polarized returning S polarized light. This S polarized light is reflected by coating 64. The quarter wave plate 63 circularly polarizes the reflected light. Light exits element 61 through a plane, spherical, or aspheric surface 65.

Figure 7:
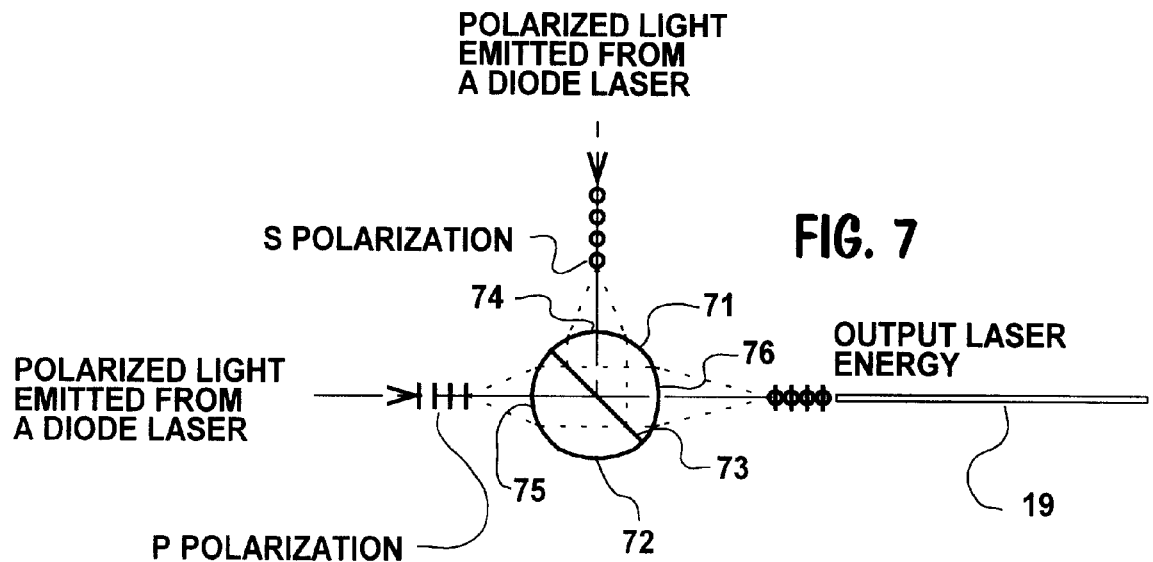
FIG. 7 illustrates the optical coupler disclosed in FIG. 5 to combine and couple diode laser output beams for input into an optical fiber.
Figure 8:
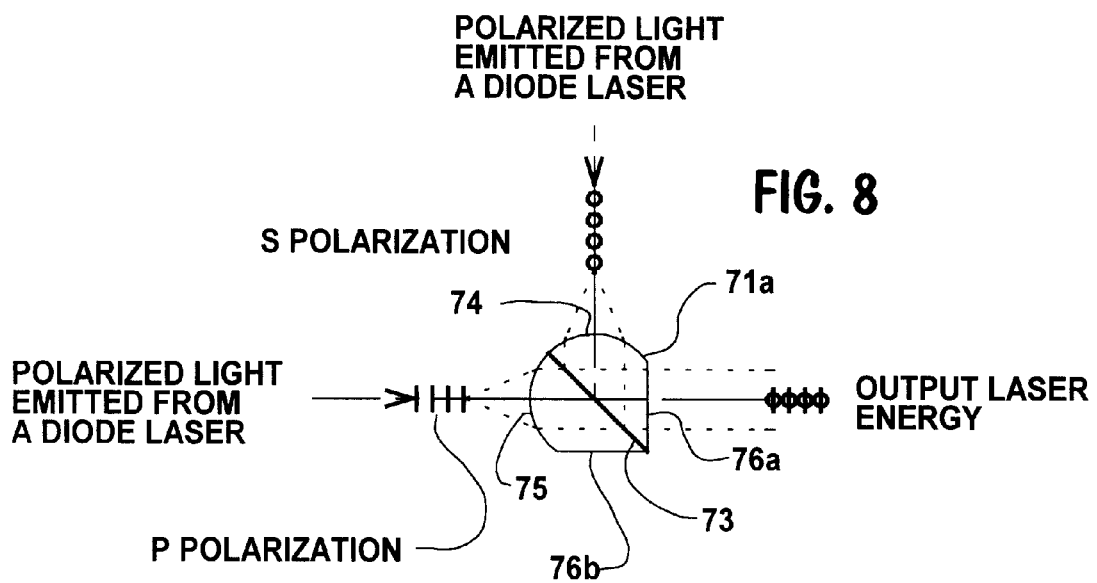
FIG. 8 illustrates an alternate embodiment of the optical coupler receiving laser light from two diode lasers and combining and converting same into a collimated beam.

FIG. 7 shows another construction according to the teachings of the present invention. Optical coupler element 71 is bonded to optical coupler element 72. A multi-layer dielectric polarized coating 73 is at the interface between elements 71 and 72 and may be applied to either element. Light from a diode laser is collimated by surface 75 in element 72. Surface 75 can be spherical or aspheric. The diode laser is oriented such that output is P polarized and is transmitted through coating 73. Light from a second diode laser is collimated by surface 74 in element 71. The second laser is oriented such that the output is S polarized and is reflected by coating 73. The two beams are coincident and exit through surface 76. Surface 76 may be planar so a collimated beam is emitted or may be spherical or aspheric, focusing the output beam into a small spot. FIG. 8 illustrates optical coupler elements 71a and 72a having planar surfaces 76a and 76b and producing a collimated beam.

The embodiments of FIG. 7 and FIG. 8 can be used with lasers that produce the same wavelength output or lasers with different wavelength outputs. For example, a visible low power laser output can be superimposed on an invisible high power near infrared diode laser output to provide a means of visualizing the system output. Two identical laser beams can be combined using this invention to provide double the laser power compared to a single diode laser output.

A dichroic coating can be substituted for the polarized coating when optical sources of two different wavelengths are combined. The dichroic coating is particularly beneficial when one or both sources is non-polarized. For example, light from an LED can be combined with light from a diode laser. The former is non-polarized and the later is generally polarized.

Figure 9:
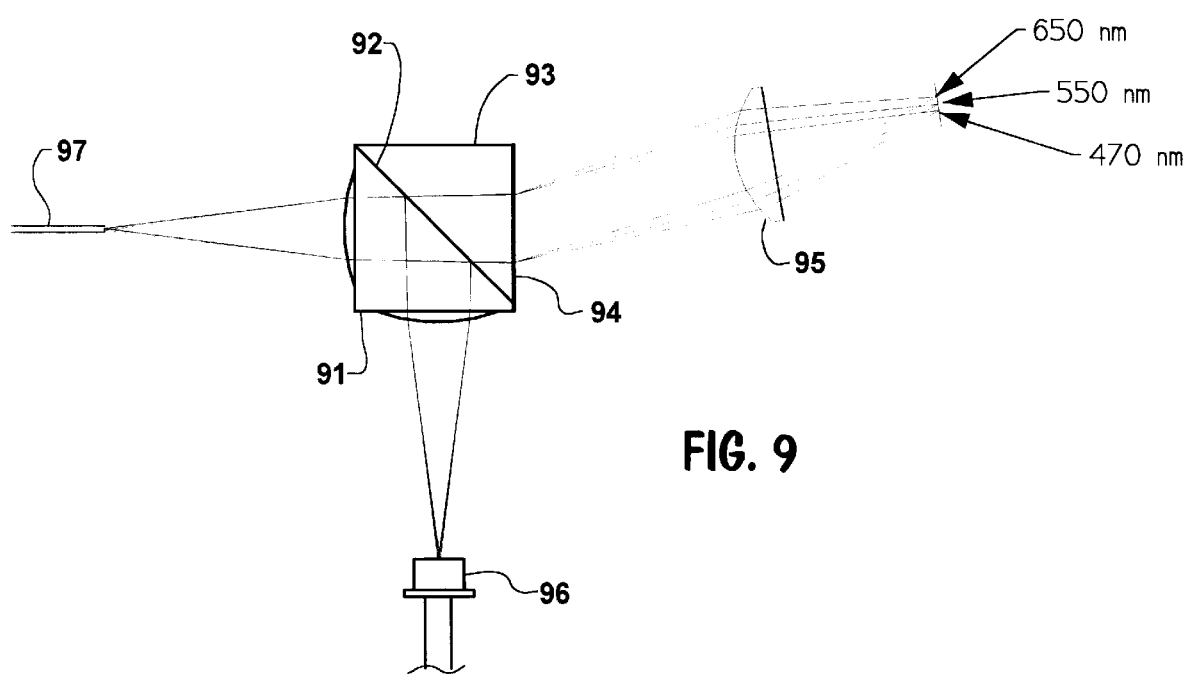
FIG. 9 illustrates yet another embodiment of the optical coupler employed in combination with a diffraction grating to provide wavelength separation of a returning signal.

FIG. 9 shows the construction of another embodiment. Laser light emitted by diode laser 96 is collimated by a convex surface in optical coupler element 91. The coating 92 reflects the laser light perpendicular to the laser axis. A convex surface in element 91 focuses the laser light into an optical fiber 97. Light returning through fiber 97 is collimated by the convex surface in element 91. Coating 92 transmits the returning light. A diffraction grating on face 94 of optical coupler element 93 diffracts the return light, spectrally dispersing the light. Lens 95 focuses the dispersed light forming a series of focused spots corresponding to various return wavelengths. Photodetectors (not shown) can be employed to detect the various return light signals.

The diffraction grating 94 on element 93 in FIG. 9 can be formed by molding the grating into element 93. An alternative method is to replicate the diffraction pattern from a master grating into a plastic material applied to the face of element 93. Another alternative method is to bond a film to the face of 93 that has a diffraction grating pattern on the non-bonded surface. This diffraction grating pattern can be formed using holographic techniques or replication of a blazed master grating.

The coating 92 between elements 91 and 93 can be applied to the hypotenuse surface of either element 91 or 93 prior to bonding these two elements together. The coating can be either a dichroic coating passing either wavelengths greater than or less than the diode output wavelength or it can be a polarized dielectric coating. The location of the incoming and exiting return signals in FIG. 9 can be reversed by using a coating that transmits rather than reflects the diode laser radiation.

The spectrally dispersed return signal can be sensed using either a few separate photodetectors or a photodetector linear array (not shown). Spectral separation of the return signal can be used for wavelength division multiplexing for fiberoptic communications. It can be used with sensor systems to measure the intensity of various wavelength return signals.

Figure 10:
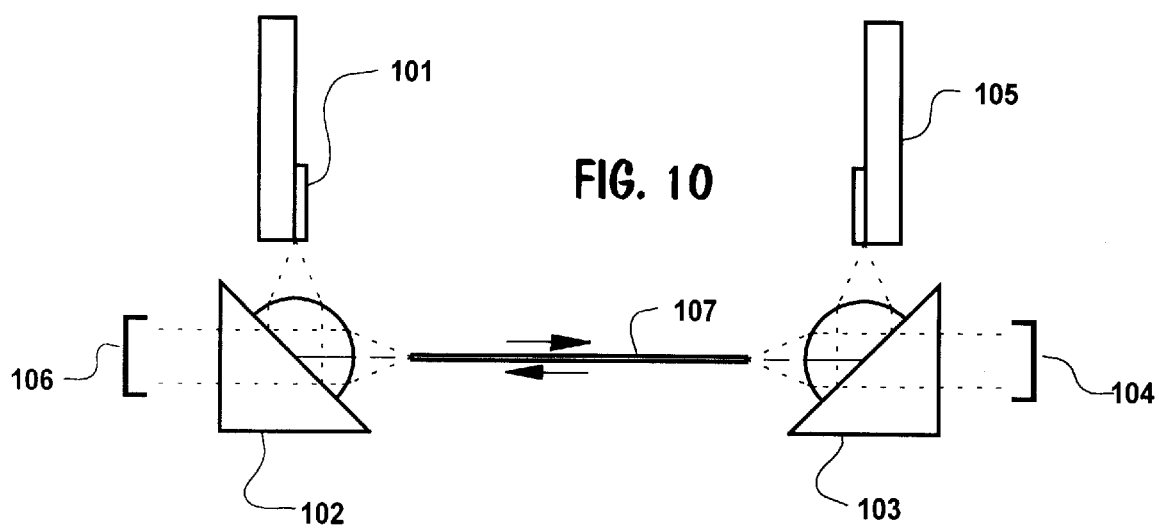
FIG. 10 is a schematic illustration illustrating application of the optical coupler for duplex fiberoptic communications.

FIG. 10 illustrates the application of the first embodiment (FIG. 4 embodiment) in a duplex fiberoptic communications system. Laser light emitted from diode laser 101 is inserted into fiberoptic 107 using the invention as described with respect to the first embodiment. The light is transmitted through the optical fiber 107 and is transmitted by element 103 to photodetector 104. Light emitted by diode laser 105 is coupled into the optical fiber 107 by element 103. The light is transmitted through element 102 to photodiode 106.

Figure 11:
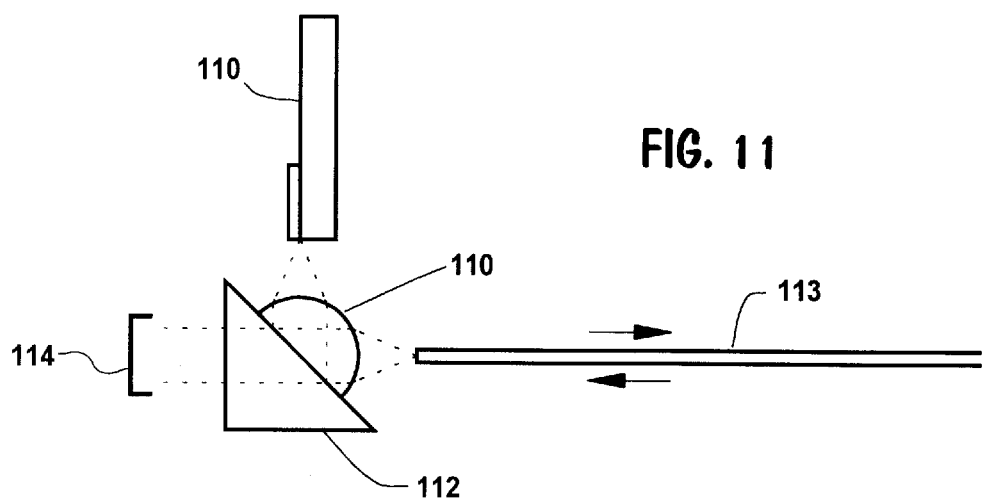
FIG. 11 is a schematic presentation illustrating application of an optical coupler constructed in accordance with the teachings of the present invention for optical sensing.

FIG. 11 illustrates the application of the first embodiment in a fiberoptic sensor system. Laser light emitted from a diode laser 110 is coupled into optical fiber 113. The light is transmitted to a sensing element on the far end of the fiber (not shown). Light is emitted or reflected by the sensing element and transmitted through element 112 to photodetector 114.

Figure 12:
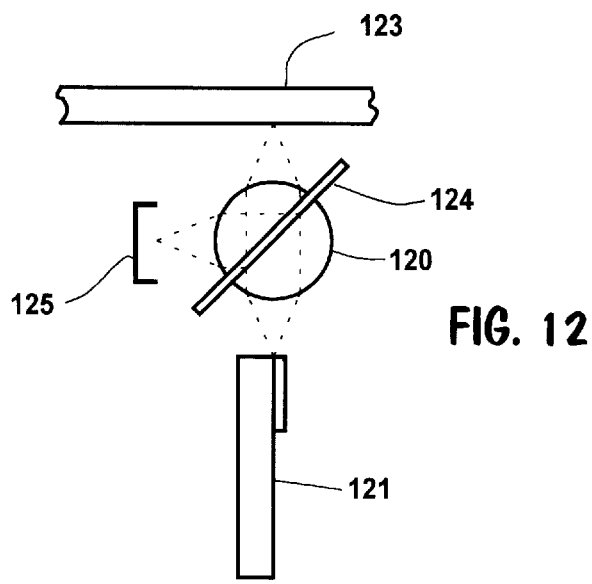
FIG. 12 illustrates the invention being employed as pick-up optics in an optical storage drive for a computer.

FIG. 12 illustrates the application of the optical coupler of the type shown in FIG. 6 in an optical data storage device. Light from diode laser 121 is collimated by the coupler. The linearly polarized laser light is circularly polarized after passing through the polarizing coating and quarter wave retardation plate 124. Upon exiting the coupler the beam is focused to a small spot by a convex surface in the coupler. Light reflected from the optical storage media 123 is collimated by the convex surface and linearly polarized by the retardation plate. The returning light reflects off the polarized coating and passes through the retardation plate where it is re-circularly polarized. Light exits the optic through a convex or plane surface and is sensed by a photodetector 125.

The optical elements forming this invention may be fabricated by molding or conventional grinding and polishing techniques. They may be fabricated from glass or plastic materials. Features may be fabricated into one or both elements for alignment and mounting. The hemispherical shapes shown in FIG. 4 and FIG. 12, for example, may be formed by grinding a sphere into a hemisphere and polishing the resultant flat face. Elements with one or more rotationally symmetric aspheric faces will most economically be fabricated using molded optics techniques.

FIG. 13 illustrates mounting and alignment members 130, 132 formed into both optical coupler elements 136, 138.

These features may be circular or planer in shape. Spherical, plane, or aspheric surfaces may be molded into the elements. The elements may contain any combination of spherical, plane, or aspheric surfaces in regions where light is transmitted or received by the element. The external surfaces may be coated with anti-reflection coatings or be uncoated.

The two optical coupler elements of the invention are preferably fabricated from the same optical material. For some applications it may be desirable to operate with non-orthogonal axis for the detector, laser, and fiberoptic. A non-orthogonal design is achieved by using different materials for the two optical elements causing refraction at the interface between the two elements to provide rotational displacement of the optical axis.

FIG. 14 shows a plan view of the construction of an optical coupler using aspheric surfaces 146, 147, 148 and 149 molded into a pair of right angle prisms 141, 142. A multi-layer dielectric polarized coating 143 is applied to the hypotenuse of one right-angle prism. The hypotenuse surfaces of the two prisms are bonded together using an optical adhesive. FIG. 14 shows an example of using two different focal length aspheric surfaces to match the numerical aperture of the diode laser source and optical fiber. FIG. 15 is a perspective view of the optical coupler consisting of two right angle prisms 141, 142 bonded together with spherical or rotationally symmetric surfaces molded into the exterior faces and the two prisms bonded together at their hypotenuses along the planar junction thereof having coating 143. FIG. 16 shows one of the optical coupler elements of FIG. 14 prior to bonding.

The aspheric surfaces are generally rotationally symmetric with respect to the optical axis of the diode laser or detector. The aspheric surface is generally of a conicoidal form described by:

$$Z = \frac{cr^2}{1 + \sqrt{1 - (1+k)c^2r^2}}$$

where Z is the sagital coordinate, c is the curvature, r is the radial coordinate, and k is the conic constant.

Many fiberoptic communications systems incorporate a duel-fiber transmit-receive architecture. Each fiber has a diode laser or LED coupled into one end of a fiber and photodectector on the other end of the fiber. Bi-directional communication is accomplished by placing a transmitter and receiver at each end of the fiberoptic pair. A repeater is used to extend the distance of long distance communications. A repeater consists of a receiver and transmitter in series in the optical fiber. Many fiberoptic communications systems utilize one wavelength light.

High data rate systems can utilize wavelength division multiplexing to increase data throughput. Wavelength division multiplexing consists of replacing the single transmit source (diode laser or LED) with two or more sources along with beam combination optics to combine the beams and couple the resultant beam into an optical fiber. The receive optic consists of a beam splitter to separate the combined signal into individual wavelength signals and distribute them to photodetectors.

Figure 17:
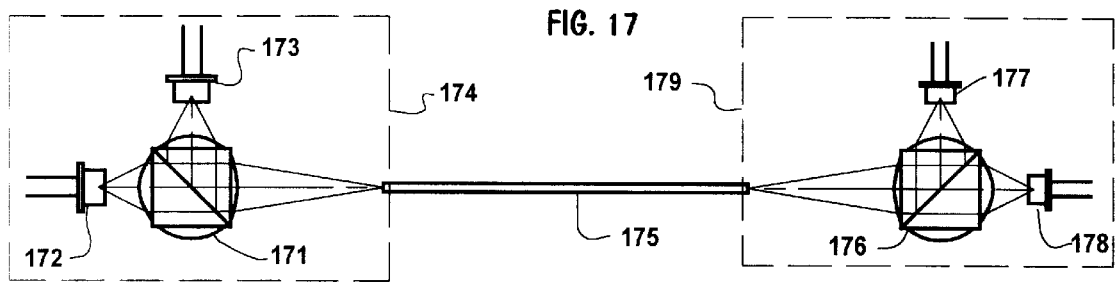
FIG. 17 illustrates an embodiment of the invention wherein a pair of optical couplers are employed in wavelength multiplexed fiberoptic communication architecture.

FIG. 17 shows a wavelength division multiplexed fiberoptic communication architecture utilizing the FIG. 4 optical coupler embodiment to combine two-different wavelength sources on the transmit end of a fiberoptic communication system and also to demultiplex the two different wavelength signals on the receive end.

In FIG. 17, the transmitter 174 consists of the coupler 171 used to multiplex two different wavelength diode lasers 172, 173. The multiplexed light is inserted into optical fiber 175. The receiver 179 consists of the coupler 176 used to demultiplex the optical signals and detect these separate wavelength signals using photodetectors 177, 178.

What is claimed is:

1. Optical signal transmission apparatus comprising, in combination:

a first optical signal source for providing an optical signal moving in a first direction;

a second optical signal source for providing an optical signal moving in a second direction;

a first optical coupler element formed of light transmitting material having at least one convex surface and a planar surface, said planar surface being disposed at an angle to the directions of the optical signals provided by said first and second optical signal sources;

a second optical coupler element formed of light transmitting material having a planar surface bonded along a planar junction to the planar surface of said first optical coupler element, the planar surface of said second optical coupler element and said planar junction disposed at said angle; and at least one coating disposed at said planar junction, said first and second optical coupler elements and said at least one coating cooperable with said first and second signal sources to reflect and redirect at least a portion of the optical signal from one of said optical signal sources and redirect the at least one portion to a first location on the surface of said optical signal transmission apparatus and to allow the transmission of at least a portion of the optical signal from the other of said optical signal sources through said at least one coating and between said first and second optical couplers to a second location on the surface of said optical signal transmission apparatus spaced from said first location.

2. The optical signal transmission apparatus according to claim 1 wherein said planar junction is disposed at a generally forty-five degree angle relative to the direction of at least one of said optical signals.

3. The optical signal transmission apparatus according to claim 1 wherein said second optical coupler element has at least one convex surface.

4. The optical signal transmission apparatus according to claim 1 wherein said at least one convex surface comprises a segment of a sphere.

5. The optical signal transmission apparatus according to claim 1 wherein said at least one convex surface is aspheric.

6. The optical signal transmission coupling apparatus according to claim 1 wherein each of said optical coupler elements is substantially hemispherical.

7. The optical signal transmission coupling apparatus according to claim 1 wherein said at least one coating is a polarizing coating.

8. The optical signal transmission coupling apparatus according to claim 3 wherein said first and second optical coupler elements are of substantially identical configuration.

9. The optical signal transmission coupling apparatus according to claim 2 wherein said second optical coupler element has a convex surface having an optical axis substantially collinear with an optical axis of a convex surface of said first optical coupler element and disposed at a forty-five degree angle relative to said planar junction.

10. The optical signal transmission coupling apparatus according to claim 1 wherein said first optical coupler element is of integral molded construction.

11. The optical signal transmission coupling apparatus according to claim 10 wherein said first optical coupler element is formed of molded plastic.

12. The optical signal transmission coupling apparatus according to claim 10 wherein said first optical coupler element is formed of glass.

13. The optical signal transmission coupling apparatus according to claim 1 wherein at least one of said optical signal sources comprises a light source in operative association with said first optical coupler element for providing light to said first optical coupler element.

14. The optical signal transmission coupling apparatus according to claim 13 wherein said light source comprises at least one diode laser.

15. The optical signal transmission coupling apparatus according to claim 13 wherein said light source comprises a light emitting diode.

16. The optical signal transmission coupling apparatus according to claim 13 additionally comprising optical fiber means for receiving at least a portion of the light provided to said first optical coupler element by said light source.

17. The optical signal transmission means according to claim 14 wherein said at least one diode laser produces laser light having a predetermined diode laser axis, said first and second optical coupler elements and said at least one coating cooperable to collimate the diode laser beam, effect relation of diode laser beam polarization, and focus the diode laser beam exiting said optical coupler elements to produce a returning beam, said first and second optical coupler elements and said at least one coating operable to collimate and separate the return beam whereby a component of the return beam is perpendicular to said diode laser axis.

* * * * *